US008209335B2

(12) United States Patent
Novak

(10) Patent No.: US 8,209,335 B2
(45) Date of Patent: Jun. 26, 2012

(54) EXTRACTING INFORMATIVE PHRASES FROM UNSTRUCTURED TEXT

(75) Inventor: Jasmine Novak, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 1845 days.

(21) Appl. No.: 11/231,075

(22) Filed: Sep. 20, 2005

(65) Prior Publication Data
US 2007/0067289 A1 Mar. 22, 2007

(51) Int. Cl.
*G06F 7/00* (2006.01)
*G06F 17/30* (2006.01)

(52) U.S. Cl. .................................. 707/748; 707/741

(58) Field of Classification Search .................. 707/3, 5, 707/6, 748, 741
See application file for complete search history.

(56) References Cited

U.S. PATENT DOCUMENTS

| | | | | |
|---|---|---|---|---|
| 5,488,725 | A * | 1/1996 | Turtle et al. | 707/5 |
| 5,675,819 | A * | 10/1997 | Schuetze | 704/10 |
| 6,523,026 | B1 * | 2/2003 | Gillis | 707/3 |
| 6,842,730 | B1 * | 1/2005 | Ejerhed et al. | 704/9 |
| 6,886,010 | B2 | 4/2005 | Kostoff | |
| 2002/0128821 | A1 * | 9/2002 | Ehsani et al. | 704/10 |
| 2004/0225667 | A1 * | 11/2004 | Hu et al. | 707/100 |
| 2005/0027512 | A1 * | 2/2005 | Waise | 704/9 |
| 2005/0125216 | A1 | 6/2005 | Chitrapura et al. | |
| 2005/0131886 | A1 | 6/2005 | Ejerhed et al. | |
| 2006/0031195 | A1 * | 2/2006 | Patterson | 707/3 |
| 2006/0184353 | A1 * | 8/2006 | Weise | 704/4 |
| 2007/0061348 | A1 * | 3/2007 | Holland et al. | 707/100 |

FOREIGN PATENT DOCUMENTS

| | | |
|---|---|---|
| WO | WO 00/62194 | 10/2000 |
| WO | WO 02/077872 A2 | 10/2002 |

OTHER PUBLICATIONS

Tomokiyo, et al., "A Language Model Approach to Keyphrase Extraction," 8 pages.

* cited by examiner

*Primary Examiner* — Shew-Fen Lin
(74) *Attorney, Agent, or Firm* — Gibb I.P. Law Firm, LLC

(57) ABSTRACT

Disclosed is a method of extracting informative phrases from a full corpus of documents. An index of phrases contained in the full corpus of documents is built. Then, a user specifies a subset of text to analyze. The subset may be defined as: (1) all paragraphs or sentences containing terms selected as defining a subject; (2) all documents in a category; (3) all documents written within a date range; and/or (3) all documents matching a Boolean query of terms. Once the subset is specified, it is analyzed to extract informative phrases. Specifically, the index is queried to retrieve all phrases within the subset. The number of times each of the phases occurs in the subset and in the corpus is counted. Each phrase contained in the subset is scored according to informativeness based on a comparison of a likelihood that the phrase occurs in the subset and a likelihood that the phrase occurs in the corpus as a whole. Only those phrases having an informativeness score above a predetermined value are considered highly informative and extracted.

18 Claims, 4 Drawing Sheets

EXTRACTING INFORMATIVE PHRASES FROM UNSTRUCTURED TEXT

BACKGROUND OF THE INVENTION

1. Field of the Invention

The invention generally relates to extracting informative phrases from unstructured text, and, more particularly, to a natural language processing of text documents for extracting phrases that best characterize the subject or set of documents being analyzed.

2. Description of the Related Art

Recently, there has been a rapid growth of on-line discussion groups and news websites on the World Wide Web (WWW). Determining what topics are being discussed on such websites and how those topics are being discussed could prove to be a valuable resource (e.g., to companies investigating market reactions to their own or a rival company's products, to politicians, etc.). However, the task of manually tracking such information from amongst the large corpus of documents contained on the Web is laborious. Therefore, there is a need for a computer-implemented method for automatically extracting a set of phrases that best characterizes a selected subject or a selected set of documents from amongst the corpus of documents contained on the Web. The challenge is both to extract these phrases quickly and to extract phrases that are meaningful and useful. For example, many Web documents have pages containing the phrase "home page"; however, this phrase is not likely to be useful in characterizing the selected subject or the selected document set. Similarly, the sequence of words "navigate>>next" may occur frequently near the selected subject or in the selected set of documents; however, this phrase is also not likely to be meaningful for most types of analysis. Therefore, the extracted phrases should be limited to phrases that provide information as to how the selected subject is being discussed or that provide information as to what language is being used in the selected set or subset of documents that differs from the rest of the corpus.

SUMMARY OF THE INVENTION

In view of the foregoing, embodiments of the invention provide a computer-implemented method of extracting phrases from a corpus of electronic documents (e.g., a body of electronic documents located on the Internet). More particularly, the method comprises first building an index of phrases contained in the running text of the corpus of electronic documents. This can be accomplished by parsing words contained within the corpus as parts of speech (i.e., tagging the parts of speech within the corpus) and, based on the tagged parts of speech, identifying multiple phrases within the corpus, (e.g, by using a POS tagger/phrase chunker combination). The multiple phrases identified can comprise all noun phrases, non-possessive pronoun phrases, adverb phrases, adjective phrases, active verb phrases and/or passive verb phrases within the document. Then, the index of phrases is built with each of the multiple phrases and the corresponding locations for each of the multiple phrases within the corpus. To avoid including in the index phrases that occur within lists, menus, etc, the text surrounding each of the multiple phrases is analyzed to determine if the phrases occur within running text and only those phrases that occur within the running text are included in the index. Additionally, to avoid including in the index phrases that occur in duplicated text, the text surrounding each of the multiple phrases is analyzed to identify duplicated text. Then, phrases occurring in duplicate text are included in the index only one time.

The method further comprises specifying a foreground set of documents (i.e., a first subset of documents within the corpus) and a background set of documents (i.e., either the entire corpus of documents or, optionally depending upon the embodiment, a second subset of documents within the corpus). The first subset of documents and, optionally, the second subset of documents can each be specified by one or more of the following processes: (1) terms that define a subject can be selected and then the subset can be specified as one of all sentences and all paragraphs containing the terms; (2) a category of documents can be selected and the subset can be specified as all documents contained in the category of documents; (3) a date range can be selected and the subset can be specified as all documents written during the date range; and (4) a Boolean query of terms can be selected and the subset can be specified as all pages matching the Boolean query of terms.

Once the first subset is specified, phrases (e.g., one, some or all phrases) contained in the first subset can be identified. Then, the previously established index of phrases is queried to retrieve the phrases identified in the first subset. Additionally, a corresponding predetermined amount of text surrounding each of the identified phrases is retrieved. The number of occurrences of each of the identified phrases in the first subset is counted. If any of the phrases occur less than a predetermined minimum number, those phrases can be discarded from further analysis. For each of the remaining phrases, a first probability that the phrase occurs in the first subset is calculated. The number of occurrences for each of the same phrases in the background set (i.e., the entire corpus or, optionally, the second subset) is counted and for each of the phrases, a second probability that the phrase occurs in background set is also calculated. Note that each of the phrases is counted only once per the corresponding predetermined amount of text.

Once the first probabilities for each phrase in the foreground set and the corresponding second probabilities for each of the same phrases in the background set are calculated, each of the phrases are scored for informativeness. The informativeness score for each phrase is based on a comparison of the first probability and the second probability for that phrase. Any phrases that score greater than a predetermined value are considered highly informative and are extracted.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF EMBODIMENTS OF THE INVENTION

Figure 1:
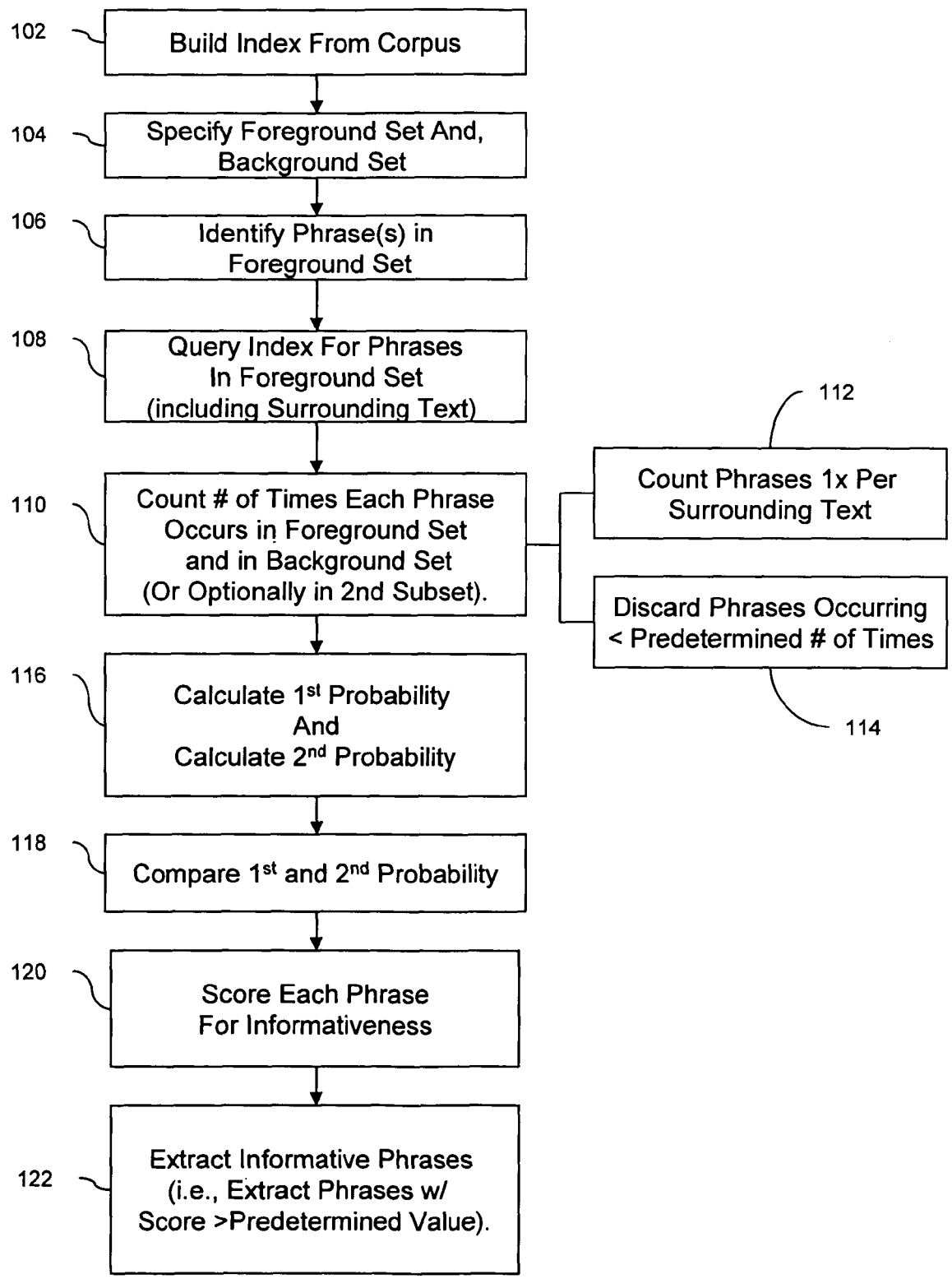
FIG. 1 is a schematic flow diagram illustrating an embodiment of the method of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

As mentioned above, there is a need for a computer implemented method for automatically extracting a set of phrases that best characterizes a selected subject or a selected set of documents from amongst the corpus of documents contained on the Web. The challenge is both to extract these phrases quickly and to extract phrases that are meaningful and useful. Therefore, disclosed herein is a computer implemented method to extract useful, meaningful phrases occurring near a subject or within a subset of documents from a large corpus of text documents in real time.

The method comprises building an index from a full corpus of documents by accessing the corpus, tagging the corpus with parts of speech and identifying all phrases (noun phrases, verb phrases, etc.) occurring within the running text of the corpus. Those phrases occurring within the running text of the corpus as well as their corresponding locations are used to build the index. Once an index is built, the user specifies a foreground set of text (i.e., a first subset of the corpus of documents) and a background set of text (i.e., either the entire corpus of documents or, optionally depending upon the embodiment, a second subset of the corpus of documents). The user may define the first subset of documents, and optionally, the second subset of documents, in a variety of ways. For example, the user may supply a set of terms that define a particular subject and, then, specify the subset as all paragraphs or sentences containing those terms. Thus, a user may select the terms "George Bush" and "John Kerry" to define the subject "Presidential Candidates" and specify the subset as all paragraphs containing those terms. Alternatively, the user may select a category of documents, such as college newspapers, and, then, specify the subset as all documents within the category. Other options include documents written during a particular date range, documents matching a Boolean query of terms, or combinations of any of the above filters. Once the foreground and background sets of text are specified, the foreground set is analyzed in relation to the background text in order to extract informative phrases. Specifically, the index is queried to identify and retrieve the phrases that occur in the foreground text, the number of times each of these identified phrases occurs in the foreground text and the number of times each of these identified phrases occurs in the background text. Then, the identified phrases contained in the foreground text are ranked according to informativeness scores and only those phrases with the highest informativeness scores are extracted.

Figure 2:
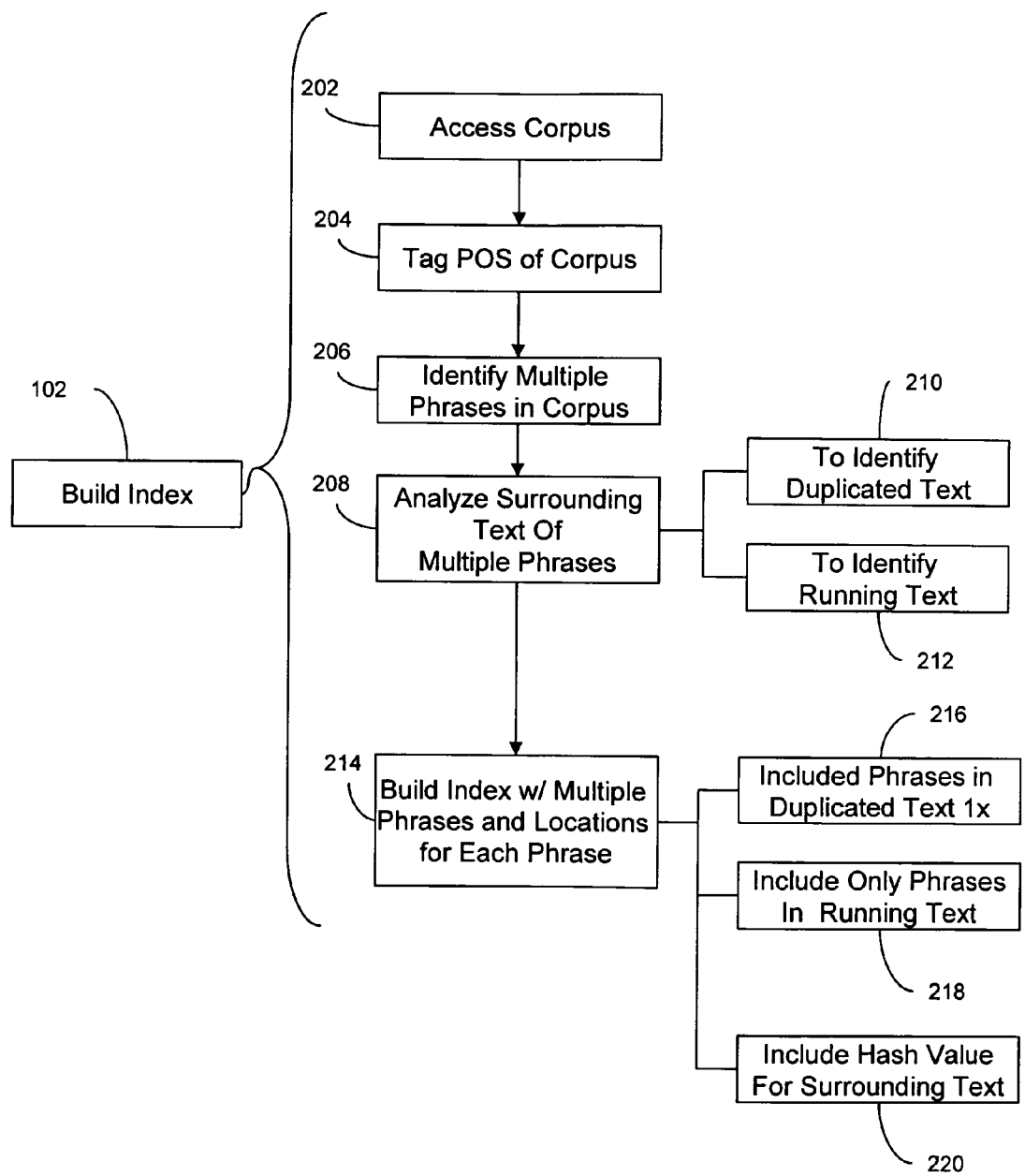
FIG. 2 is a schematic flow diagram illustrating process 102 of FIG. 1.

More particularly, referring to FIG. 1, embodiments of the invention provide a computer-implemented method of extracting phrases from a corpus of electronic documents (e.g., from a body of unstructured text-based documents located on the Internet, World Wide Web (WWW), a wide are network (WAN), a local area network (LAN), etc.). As mentioned above, the method comprises first building an index of phrases contained in the running text of the corpus of electronic documents (102). As illustrated in FIG. 2, the index can be built by first accessing the corpus of documents (e.g., by using an input device and communications link to access the Internet, WWW, WAN, LAN, etc.) (202). The corpus of documents can be reviewed and the words within the documents can be parsed as parts of speech (i.e., the words within the documents can be tagged as parts of speech (POS) using a standard POS tagger) (204). Then, based on the tagged parts of speech, multiple phrases within the corpus can be identified (e.g, by using a standard phrase chunker) (206). The multiple phrases identified can comprise all noun phrases, non-possessive pronoun phrases, adverb phrases, adjective phrases, active verb phrases and/or passive verb phrases within the document. The exception is active verb phrases with "to" which are excluded. This latter type includes phrases such as "to be", etc., which are not informative. The processes of tagging parts of speech in the corpus and identifying the multiple phrases contained in the corpus can be accomplished using known techniques, e.g., as illustrated in U.S. Patent Application Publication No.: US2005/0125216A1, application Ser. No. 10/729,165, Inventors: Chitrapura et al., Filed: Dec. 5, 2003, and incorporated herein by reference.

Once the parts of speech are tagged (at process 204) and the multiple phrases are identified (206), the index of phrases is built and stored in memory. The index of phrases can be built such that it includes each of the multiple phrases identified and the corresponding locations for each of the multiple phrases within the corpus (214). To avoid including uninformative phrases in the index, such as non-grammatical phrases that occur within lists, menus, etc, or duplicate phrases, the text surrounding each of the multiple phrases is analyzed prior to entry into the index (208). For example, the surrounding text may be analyzed using known techniques to determine if all of the phrases occur within running text (i.e., words that form sentences, which are in turn formed into paragraphs) (212) and only those phrases that occur within running text are entered into the index (218). Similarly, the text surrounding each of the multiple phrases can be analyzed to identify duplicated text (210). Then, phrases occurring in duplicate text are entered in the index only one time (216). This eliminates many phrases that are not informative, such as those in site navigation templates. It also avoids over-counting phrases occurring in syndicated articles. To achieve this duplicate elimination a hash value for the text surrounding the phrase can be provided so that a predetermined number of words before and following a phrase are also entered in the index (220).

Figure 3:
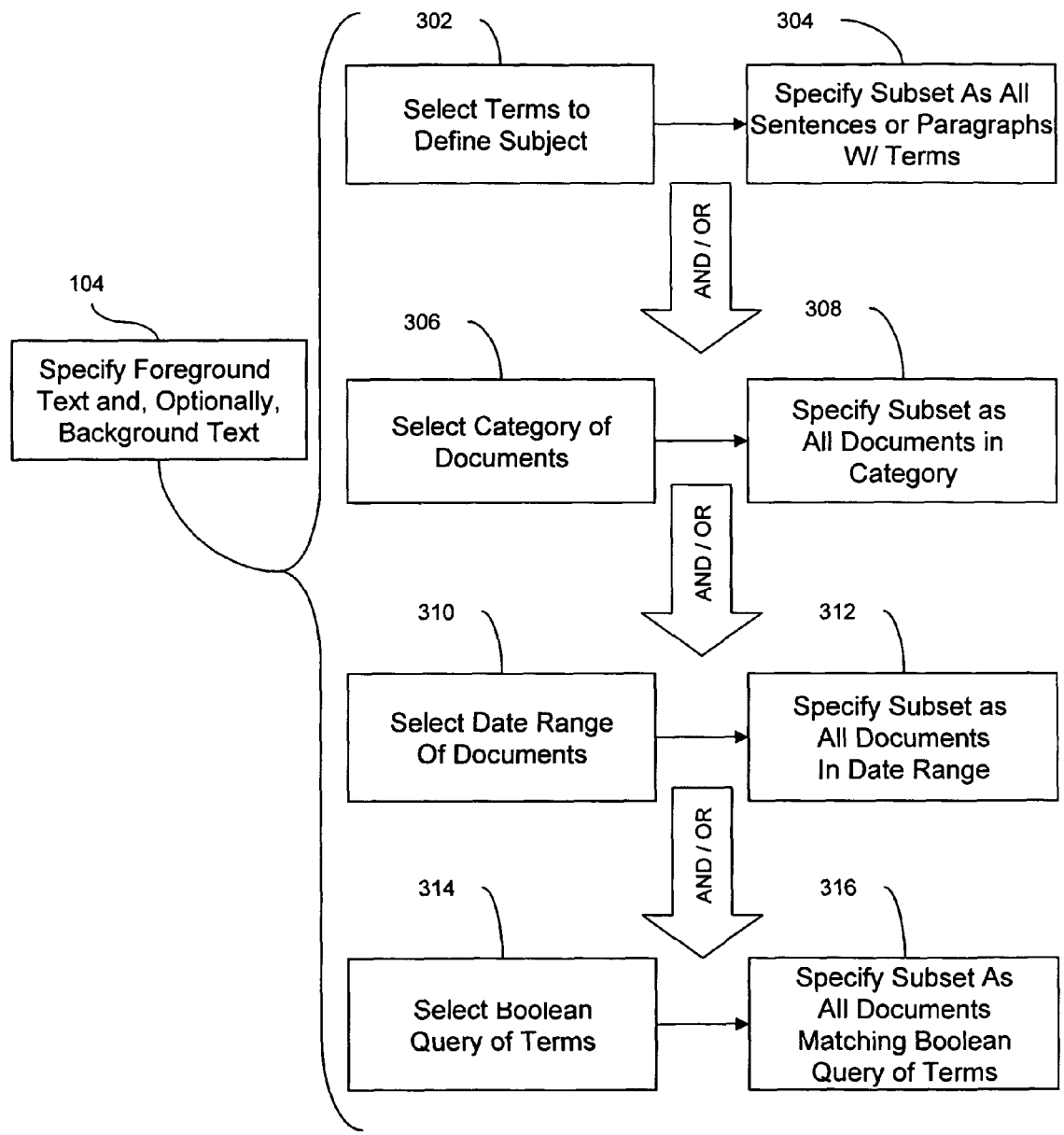
FIG. 3 is a schematic flow diagram illustrating process 104 of FIG. 1.

Referring again to FIG. 1, the method further comprises specifying a foreground set (i.e., a first subset of documents from the corpus) and a background set (i.e., either the entire corpus of documents or, optionally depending upon the embodiment, a second subset of documents from the corpus) (104). As illustrated in FIG. 3, the first subset and, optionally, the second subset, can be specified by one or more of the following processes: (1) terms that define a subject can be selected (302) and then the subset can be specified as either all sentences or all paragraphs containing the terms (304); (2) a category of documents (e.g., college newspapers or business journals) can be selected (306) and the subset can be specified as all documents contained in the category of documents (308); (3) a date range can be selected (310) and the subset can be specified as all documents written during the date range (312); and (4) a Boolean query of terms (e.g., pages that mention "George Bush" and "Iraq" but not "Tony Blair") can be selected (314) and the subset can be specified as all pages matching the Boolean query of terms (316).

Once the first subset is specified at process 104, phrase (e.g., one, some or all phrases) contained in the first subset can be identified (106) and the index of the phrases is accessed and queried to retrieve those phrases contained in the first subset (108). Additionally, a corresponding predetermined amount of text surrounding each of the phrases is retrieved. Then, the number of occurrences for each of the phrases in the first subset is counted (110). If any of the phrases occur less than a predetermined minimum number, those phrases can be discarded from further analysis (114). For each of the remaining phrases, a first probability that the phrase occurs in the first subset is calculated (116). For each of the remaining phrases, a corresponding number of occurrences in the background set (i.e., the entire corpus or the second subset depending upon the embodiment) is counted (110) and a corresponding second probability that the phrase occurs in the background set is also calculated (116). Note that each of the phrases is counted only once per the corresponding predetermined amount of text (112).

More particularly, once the foreground text (i.e., the subset) is specified, the index is queried to retrieve the phrases that occur in the foreground text, along with the hash of the text surrounding each phrase (108). The number of occurrences of each phrase in the foreground text is counted (110). As the phrases are counted, the hashes for the surrounding text for each phrase are recorded. A phrase is only counted once per unique surrounded text (112). However, for large indices, the counts can be estimated by retrieving a random sample of the phrases in the foreground set. Those phrases that occur below a threshold number of times (e.g., 3-5) are discarded. The index is then queried again to retrieve the counts for each of the phrases in the entire corpus (i.e., the background text) (110). The phrases are then scored for informativeness (120). Then, those phrases that have the highest informativeness scores, and particularly, those phrases that have scores higher than a predetermined value (e.g., greater than one) are extracted (122).

Specifically, the informativeness score compares the likelihood of each phrase occurring in the foreground text with the likelihood it occurs in the background text (118). The informativeness score is used to choose phrases from the foreground set that stand out as being interesting in relation to the background set of documents. For example, each phrase may be scored for "informativeness" (i.e., "pointwise KL-divergence"), as illustrated in "A Language Model to Keyphrase Extraction" by Takashi Tomokiyo and Matthew Hurst, Applied Research Center, Intelliseek, Inc., http://acl.ldc.upenn.edu/W/W03/W03-1805.pdf, and incorporated herein by reference. For example, the informativeness score for a phrase w can be defined as follows: Let p(q) be the first probability for a phrase (i.e., the probability that the phrase occurs in the foreground set. Let q(w) be the second probability for the phrase (i.e., the probability that this same phrase occurs in the background set). The informativeness of w is then p(w)*log(p(w)/q(w)), which is the point-wise KL-divergence of the phrase w (i.e., the amount of information lost by assuming the phrase is drawn from the background set, rather than the foreground set. As described above, the user can specify either the entire corpus or a subset of the corpus as the background text with which to compare the phrases in the foreground text.

Embodiments of the computer implemented method, described above, can take the form of an entirely hardware embodiment, an entirely software embodiment or an embodiment including both hardware and software elements. In a preferred embodiment, the invention is implemented using software, which includes but is not limited to firmware, resident software, microcode, etc. Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Figure 4:
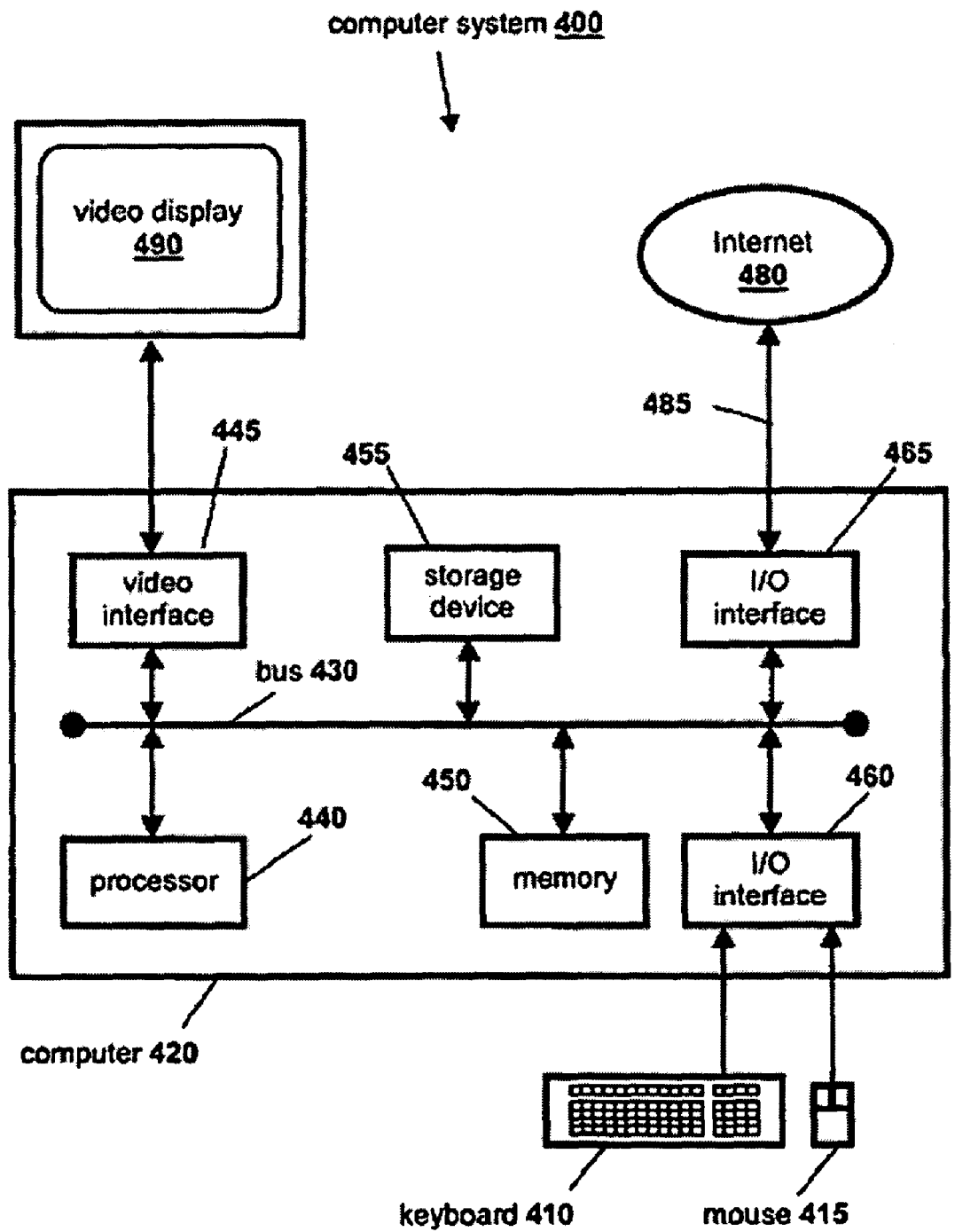
FIG. 4 is a schematic representation of a computer system suitable for use in text processing as described herein.

FIG. 4 is a schematic representation of a computer system 400 that can be used for text processing as described herein. Computer software executes under a suitable operating system installed on the computer system 400 to assist in performing the described techniques. This computer software is programmed using any suitable computer programming language, and may be though of as comprising various software code means for achieving particular steps. The components of the computer system 400 include a computer 420, a keyboard 410 and a mouse 415, and a video display 490. The computer 420 includes a processor 440, a memory 450, input/output (I/O) interfaces 460, 465, a video interface 445, and a storage device 455. The processor 440 is a central processing unit (CPU) that executes the operating system and the computer software executing under the operating system. The memory 450 includes random access memory (RAM) and read-only memory (ROM), and is used under direction of the processor 440. The video interface 445 is connected to video display 490. User input to operate the computer 420 is provided from the keyboard 410 and mouse 415. The storage device 455 can include a disk drive or any other suitable storage medium. Each of the components of the computer 420 is connected to an internal bus 430 that includes data, address, and control buses, to allow components of the computer 420 to communicate with each other via the bus 430. The computer system 400 can be connected to one or more other similar computers via input/output (I/O) interface 465 using a communication channel 465 to a network, represented as the Internet 480. The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420. Other configurations or types of computer systems can be equally well used to implement the described techniques. The computer system 400 described above is described only as an example of a particular type of system suitable for implementing the described techniques.

Therefore, disclosed above is a method to extract useful, meaningful phrases occurring near a subject or within a subset of documents from a large corpus of text documents in real time. The method comprises building an index of phrases contained in the running text of a full corpus of documents. The user specifies a subset of text to analyze. For example, the subset may be defined as: (1) all paragraphs or sentences containing terms selected as defining a given subject; (2) all documents in a given category; (3) all documents written within a given date range; and/or (3) all documents matching a Boolean query of terms. Once the subset is specified, it is analyzed to extract informative phrases. Specifically, the index is queried to retrieve all phrases within the subset and the number of times each of the phases occurs in the subset and in the corpus (or a specified second subset of the corpus) is counted. Each of the phrases contained in the subset are then scored according to informativeness based on the first frequency at which they occur in the subset as compared to the second frequency at which they occur in the corpus (or second subset). Only those phrases having a first frequency to second frequency ratio that is greater than a predetermined ratio are considered informative and extracted.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of embodiments, those skilled in the art will recognize that the invention can be practiced with modification within the spirit and scope of the appended claims.

What is claimed is:

1. A computer-implemented method of extracting phrases from a corpus of electronic documents, said method comprising:
   specifying a subset of said corpus;
   identifying a phrase contained in said subset;
   determining a number of times said phase occurs in said subset;
   querying an index of phrases and corresponding locations in said corpus, said phrases comprising only phrases that are contained in running text of said corpus and said querying comprising determining a number of times said phrase occurs in said running text of said corpus;
   scoring said phrase based on a comparison of a first probability for said phrase and a second probability for said phrase, wherein said first probability comprises a likelihood that said phrase occurs in said subset and said second probability comprises a likelihood that said phrase occurs in said corpus; and
   extracting said phrase only if said phrase is scored above a predetermined value.

2. The method of claim 1, further comprising:
   parsing words contained within said corpus as parts of speech;
   identifying multiple phrases within said corpus based on said parts of speech; and
   building said index of phrases with said multiple phrases and corresponding locations within said corpus for each of said multiple phrases.

3. The method of claim 2, wherein said building of said index further comprises:
   analyzing text surrounding each of said multiple phrases to determine if each of said multiple phrases occurs within running text of said corpus; and
   entering into said index only phrases that occur within said running text.

4. The method of claim 2, wherein said building of said index further comprises:
   based on said analyzing of said text surrounding each of said multiple phrases, identifying duplicated text that is within said corpus and that contains any one of said multiple phrases; and
   only entering into said index one time phrases that occur within said duplicated text.

5. The method of claim 1, wherein said querying of said index further comprises retrieving both said phrase and a corresponding predetermined amount of text surrounding said phrase, and
   wherein said determining of said number of times said phrase occurs in said subset and said number of times said phrase occurs in said corpus comprises counting how often said phrase occurs in said subset and how often said phrase occurs in said corpus such that said phrase is counted only once per said corresponding predetermined amount of text.

6. The method of claim 1, wherein said specifying of said subset comprises at least one of:
   selecting terms that define a subject and specifying said subset as one of all sentences and all paragraphs containing said terms;
   selecting a category of documents and specifying said subset as all documents contained in said category of documents;
   selecting a date range and specifying said subset as all documents written during said date range; and
   selecting a Boolean query of terms and specifying said subset as all pages matching said Boolean query of terms.

7. The method of claim 1, further comprising:
   discarding said phrase from further analysis if said number of times is below a predetermined minimum number.

8. A computer-implemented method of extracting phrases from a corpus of electronic documents, said method comprising:
   specifying a first subset of said corpus and a second subset of said corpus different from said first subset;
   identifying a phrase contained in both said first subset and said second subset;
   determining a number of times said phrase occurs in said first subset and a number of times said phrase occurs in said second subset;
   scoring said phrase based on a comparison of a first probability of said phrase and a second probability of said phrase, wherein said first probability comprises a likelihood that said phrase occurs in said first subset and said second probability comprises a likelihood that said phrase occurs in said second subset;

extracting said phrase only if said phrase is scored above a predetermined value;
parsing words contained within said corpus as parts of speech;
identifying multiple phrases within said corpus based on said parts of speech;
building an index of phrases with said multiple phrases and corresponding locations within said corpus for each of said multiple phrases, wherein said building of said index further comprises:
analyzing text surrounding each of said multiple phrases to determine if each of said multiple phrases occurs within running text of said corpus; and
entering into said index only phrases that occur within said running text.

9. The method of claim 8, wherein said building of said index further comprises:
based on said analyzing of said text surrounding each of said multiple phrases, identifying duplicated text that is within said corpus and that contains any one of said multiple phrases; and
only entering into said index one time phrases that occur within said duplicated text.

10. The method of 8, querying said index, said querying comprising:
retrieving from said index both said phrase and a corresponding predetermined amount of text surrounding said phrase, and
counting how often said phrase occurs in said first subset and how often said phrase occurs in said second subset such that said phrase is counted only once per said corresponding predetermined amount of text.

11. The method of claim 8, wherein said specifying of said first subset and said specifying of said second subset each comprises at least one of:
selecting a date range and specifying said second subset as all documents written during said date range; and
selecting a Boolean query of terms and specifying said first subset as all pages matching said Boolean query of terms.

12. The method of claim 8, further comprising:
discarding said phrase from further analysis if said number of times said phrase occurs in said first subset is below a predetermined minimum number.

13. A computer program product for extracting phrases from a corpus of electronic documents, said computer program product comprising: a computer usable medium, said medium being a non-transitory storage medium only and having computer usable program code embodied therewith, said computer usable program code comprising: computer useable program code configured to perform a method, said method comprising:
specifying a subset of said corpus;
identifying a phrase contained in said subset;
determining a number of times said phase occurs in said subset;
querying an index of phrases and corresponding locations in said corpus, said phrases comprising only phrases that are contained in running text of said corpus and said querying comprising determining a number of times said phrase occurs in said running text only of said corpus;
scoring said phrase based on a comparison of a first probability for said phrase and a second probability for said phrase, wherein said first probability comprises a likelihood that said phrase occurs in said subset and said second probability comprises a likelihood that said phrase occurs in said corpus; and
extracting said phrase only if said phrase is scored above a predetermined value.

14. The computer program product of claim 13, wherein said method further comprises:
parsing words contained within said corpus as parts of speech;
identifying multiple phrases within said corpus based on said parts of speech; and
building said index of phrases with said multiple phrases and corresponding locations within said corpus for each of said multiple phrases.

15. The computer program product of claim 14, wherein said building of said index further comprises:
analyzing text surrounding each of said multiple phrases to determine if each of said multiple phrases occurs within running text of said corpus; and
entering into said index only phrases that occur within said running text.

16. The computer program product of claim 13, wherein said building of said index further comprises:
based on said analyzing of said text surrounding each of said multiple phrases, identifying duplicated text that is within said corpus and that contains any one of said multiple phrases; and
only entering into said index one time phrases that occur within said duplicated text.

17. The computer program product of claim 13, wherein said querying of said index further comprises retrieving both said phrase and a corresponding predetermined amount of text surrounding said phrase, and
wherein said determining of said number of times said phrase occurs in said subset and said number of times said phrase occurs in said corpus comprises counting how often said phrase occurs in said subset and how often said phrase occurs in said corpus such that said phrase is counted only once per said corresponding predetermined amount of text.

18. The computer program product of claim 13, wherein said specifying of said subset comprises at least one of:
selecting terms that define a subject and specifying said subset as one of all sentences and all paragraphs containing said terms;
selecting a category of documents and specifying said subset as all documents contained in said category of documents;
selecting a date range and specifying said subset as all documents written during said date range; and
selecting a Boolean query of terms and specifying said subset as all pages matching said Boolean query of terms.

* * * * *